United States Patent Office 3,366,667
Patented Jan. 30, 1968

3,366,667
TELOMERS OF DIALLYL PHTHALATE AND POLYCHLOROALKANES
Daniel Porret, Basel, and Ernst Leumann, Arlesheim, Switzerland, assignors to Ciba Limited, Basel, Switzerland, a Swiss company
No Drawing. Filed Apr. 24, 1964, Ser. No. 362,452
Claims priority, application Switzerland, May 3, 1963, 5,583/63
5 Claims. (Cl. 260—475)

ABSTRACT OF THE DISCLOSURE

Telomers of the formula

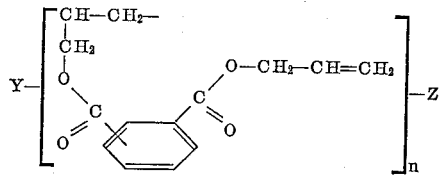

in which Y and Z represent the atoms and radicals formed by splitting a polychloroalkane YZ, said polychloroalkane consisting of a chain of 2 to 3 carbon atoms and to said carbon atoms are attached 5 to 8 chlorine atoms, and $n$ is an integer of at least 2 and at the most 50.

---

Telomerization is a known reaction in which an ethylenically unsaturated monomer (the so-called "Taxogen" or "Compound A") is reacted with a so-called telogen of the formula YZ. One obtains in this way a telomer which carries at the ends the predetermined atoms or atomic groups Y and Z of the telogen.

Already in German Auslegeschrift No. 1,123,111 it has been suggested to telomerise diallylphthalate in the presence of larger amounts of carbon tetrachloride as telogen. Benzoyl peroxide was used as telomerization catalyst and the telomer was precipitated with methanol.

In reproducing the examples it has been found, however, that the actual yields are not as high as stated in the German specification, since in the latter the percipitation of the telomer was carried out with insufficient methanol. As a consequence a telomer was obtained which still contains about 20% of entrained monomer, and after drying produces a sticky material, difficult to handle, which is partly hard and partly soft. Since the monomer content may vary very considerably according to the method of precipitation even during one operation, telomers are obtained of very variable composition which are not capable of supplying moulding materials of consistent composition.

The employment of carbon tetrachloride consequently is attended with disadvantages, since this telogen is a very good solvent for the telomer formed. For the precipitation of the telomer large quantities of methanol are used in order to compensate for the solvent effect of the carbon tetrachloride. Another disadvantage is the pollution of the methanol used for precipitation with carbon tetrachloride which makes it necessary even after few operations to purify by fractional distillation the methanol used for precipitation. The proximity of the boiling points of carbon tetrachloride and methanol makes it impossible simply to distill off the methanol economically.

It has now been found that these disadvantages may be avoided by using as telogen polychloroalkanes containing 2–3 carbon atoms and 5–8 chlorine atoms. These substances permit the use of methanol for precipitation for long periods without regeneration. When, however, regeneration becomes necessary it is sufficient simply to distill off the methanol since the telogens used in the process of the invention distill not at all or only in very small quantities and remain in the radical consisting of unconverted monomers.

The present invention accordingly provides new telomerizates of the formula (I)

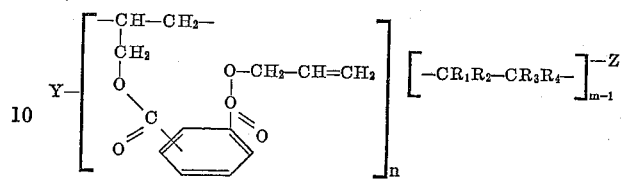

in which Y and Z stand for atoms and atomic groups formed by splitting a polychloroalkane YZ with 2–3 carbon atoms and 5–8 chlorine atoms as telogen (Y is a hydrogen or chlorine atom, and Z the rest of the polychloroalkane molecule), and in which $R_1$, $R_2$, $R_3$ and $R_4$ stand for hydrogen atoms, halogen atoms or for organic substituents of low molecular weight, and in which $n$ and $m$ are small numbers of the value of at least 1, the sum $n+(m-1)$ being not less than 1 and not more than 50, preferably, not less than 2 and not more than 20, and the order of the individual structure members

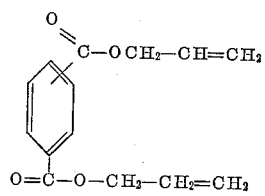 and [—CR$_1$R$_2$—CR$_3$R$_4$— in the chain being optional.

The new telomers are obtained, according to the invention, by converting 1 mol of a polychloroalkane with 2–3 carbon atoms and 5–8 chlorine atoms with $n$ mol of diallylphthalate of the formula

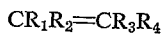

and, in certain cases, also $(m-1)$ mol of a monomer of the formula (II) $\qquad CR_1R_2=CR_3R_4$ where the radical $R_1$, $R_2$, $R_3$ and $R_4$ have the above stated meaning, preferably in the presence of a catalyst supplying free radicals.

As diallylphthalates may be used diallyl isophthalate, terephthalate and, in particular, -o-phthalate.

Preferred telogens are hexachloroethane, pentachloroethane and 1,1,1,2,3,3,3-heptachloropropane.

The telomerization according to the invention may be carried out in known manner in the presence of the usual telomerization catalysts. The operation, for instance, is carried out in the temperature range of 0° C. to 200° C., suitably at an elevated temperature between 50° C. and 150° C. and at pressures which ensure that the reaction components remain in the liquid phase. The process can be carried out discontinuously or continuously. Since with increasing proportion of telogen in the reaction mixture, in general the telomerization degree $n$, or the average molecular weight of the telomer drops, usually an excess of telogen is an advantage. The telomerization may also be carried out in solvents, in particular those in which the telomer is insoluble and is precipitated during telomerization. It has been found that good results are obtained when one telomerizes in the presence of small quantities of lower aliphatic alcohols, such, for example, as isopropanol or methanol. Further, the telomerization may be carried out, for example, in aqueous emulsion. Alternative suitable solvents are benzene, octane or hexadecane, and also lower ketones.

The various telomer fractions can, besides precipitation, also be isolated by other usual methods, such as distillation or solvent extraction.

As telomerization catalysts the usual, free radical-forming catalysts are preferably used. Mention may be made here of hydrazine derivatives, for instance hydrazinehydrochloride; organometallic compounds, e.g. tetraethyl lead; as well as in particular aliphatic azo compounds, e.g. $\alpha,\alpha'$-azoisobutyrodinitrile; and organic peroxides or persalts, such for instance as per-acetic acid, acetyl peroxide, chloroacetyl peroxide, trichloroacetyl peroxide, benzoyl peroxide, chlorobenzoyl peroxide, benzoylacetyl peroxide, propionyl peroxide, fluorochloropropionyl peroxide, lauryl peroxide, cumene hydroperoxide, t-butyl hydroperoxide, di-t-butyl peroxide, di-t-amyl peroxide, paramethane, hydroperoxide; further inorganic peroxide compounds, e.g. sodium peroxide, alkali metal percarbonates, alkali metal persulfates or alkali metal perborates, and, in particular, hydrogen peroxide which advantageously may replace the more expensive benzoyl peroxide. The addition is regulated in a known manner in accordance with the desired progress of the reaction or the desired properties of the telomerizates. Preferably, about 0.05 to 10 percent by weight of the catalyst, based on the total weight of the monomers or taxogen, are used, and the total quantity of catalyst is either added at the beginning or in portions during the progress of telomerization.

In certain cases cationic or anionic catalysts may also be used. Among the cationic catalysts Lewis acids may be mentioned, as well as hydrogen ions, $PF_5$, $BF_3$, $SnCl_4$, $SbCl_5$, $AlCl_3$, and metal salts, such as the halides of beryllium, calcium, magnesium, strontium, barium, iron, zinc, tin and titanium and their hydrogen halide adducts, oxonium salts and other Meerwein catalysts, e.g. chlorosulfonic acid, fluorosulfonic acid, p-chlorophenyldiazoniumhexafluorophosphate, and anilinium tetrafluoroborate.

As anionic catalysts may be used Lewis bases, for instance metal alkyl or strong alkalis, e.g. NaOH, organometal esters, like tetrabutyl titanate, metal-hydrogenalkyls or addition products of Lewis bases with metal salts, e.g. zinc chloride. The telomerization can in certain cases also be initiated by actinic rays or by heating even without the addition of a catalyst.

Besides the polychloroalkanes used, according to the invention, as telogens, like hexachloroethane, pentachloroethane or 1,1,1,2,3,3,3-heptachloropropane, other additional telogens may be used, like other halogenated hydrocarbons, for instance carbon tetrachloride, chloroform, chloriodomethane, methylene chloride, methyl iodide, monobromomonochlorodifluoromethane, oxo-compounds, for instance benbzaldehyde, cyclohexanone, or acetaldehyde alcohols, for instance ethanol, benzyl alcohol or phosphorus compounds, like dialkyl phosphites or phosphonates.

As cotaxogens (II) which, in some cases, are cotelomerized with the diallylphthalate, those may be used which contain a carbon-to-carbon-double link, in particular, a $H_2C=C$ group. Here may be mentioned polymerizable olefins, like ethylene, propylene, butene, isobutylene, amylene, hexylene, butadiene, halogenated olefins like vinyl fluoride, fluoroprene, vinylidene fluoride, difluoroethylene, trifluoroethylene, tetrafluoroethylene, difluoromonochloroethylene, dichloromonofluoroethylene, trifluorochloroethylene, difluorodichloroethylene, perfluoropropene, perfluorobutene, vinyl chloride, vinylidene chloride, trichloroethylene, chloroprene, tetrachloroethylene, perchloropropene, vinyl ethers, e.g. vinyl methyl ether, vinyl ethyl ether, vinylphenyl ether, and vinyl aryl compounds, like styrene, $\alpha$-methylstyrene and other substituted styrenes. Furthermore, compounds of the acrylic acid series, e.g. esters of acrylic acid or methacrylic acid and alcohols or phenols, such, for example, as ethyl acrylate, butyl acrylate, dodecyl acrylate, methyl methacrylate, acrylic acid nitrile, methacrylic acid nitrile, amides of acrylic and methacrylic acid. Further analogous derivatives of $\alpha$-fluoroacrylic acid, $\alpha$-chloroacrylic acid, crotonic acid, maleic acid or fumaric acid. Further cotaxogens containing epoxy groups, like monoepoxybutadiene, monoepoxydivinylbenzene, and in particular, allyl compounds like diallyl phthalate, triallyl cyanurate, chloroallyl acetate, chloroallyladipate and chloroallyl itaconate.

One can of course also produce, e.g. ternary and quaternary cotelomers by cotelomerization of diallylphthalates with 2 or more different taxogens of the Formula II. Furthermore, one can also produce cotelomers by cotelomerization of different diallylphthalates.

The homotelomers and cotelomers according to the invention may be used for a variety of applications. They are in general, at room temperature freely flowing meltable powders, soluble in the usual organic solvents like acetone, $CHCl_3$, benzene, ethyl acetate, which can be used wherever hardenable condensation resins and/or polymerization resins are employed. They are particularly suitable for moulding materials, in particular in connection with peroxide hardeners, fillers, separators, dyes, stabilizing agents and, in certain cases, monomers and strengthening agents. The telomers can, in addition, either alone or together with other hardenable condensation resins, such, for example, as aminoplasts, phenoplasts, epoxy resins, and polyacetals from polyalcohols and aldehydes, in filled or unfilled condition, with or without hardeners, in solution or emulsion, serve as assistants for textiles, as lacquers paint, resins for dipping, casting resins or laminates, coating, filling and puttying materials, and adhesives, or in the production of these materials.

In the following examples percentages are by weight. The temperatures are in degrees centigrade.

*Example 1*

In a 350 ml. three-necked flask with stirrer, thermometer and reflux condenser, a mixture of 200 g. of diallyl phthalate and 20 g. of hexachloroethane was telomerized after the addition of 1.55 ml. of 55% hydrogen peroxide, at 105° C. After 7½ hours a sample dissolved in 3 ml. of chloroform, clouded when 2.7 ml. of methanol were added. The reaction mixture was then cooled to 50° C. and precipitated by slow pouring into 1600 ml. of stirred, ice-cold methanol. The precipitated telomer was sucked off, homogenized while still wet with 600 ml. of methanol and again sucked off. The filter residue was dried at 40° C. in vacuum. 81.5 g. of telomer was obtained as a white powder with a chlorine content of 2.8% and an iodine number of 56. The powder dissolved in acetone to give a clear solution. The amount of diallyl phthalate used, based on the chlorine content, was 39.5%, while that of the hexachloroethane was 12.7%.

*Example 2*

As described in the previous example, a mixture of 200 g. of diallyl phthalate, 20 g. of 1,1,1,2,3,3,3,-heptachloropropane and 11 g. of isopropanol was telomerized at 90° C. for 5 hours after the addition of 3.3 g. of benzoylperoxide. After this time, the reaction mixture had an iodine number of 109. It was cooled, as described in Example 1, precipated in 900 ml. of methanol, sucked off, again triturated with 300 ml. of methanol and dried at 40° C. in a vacuum. 118 g. of telomer was obtained as a white powder, which dissolved in acetone to give a clear solution. The chlorine content amounted to 4.59%. Calculated from the chlorine content 55.8% of the diallyl phthalate and 31% of the 1,1,1,2,3,3,3-heptachloropropane were used up.

*Example 3*

As described in the previous examples, a mixture of 100 g. of diallyl phthalate with 10 g. of pentachloroethane was telomerized at 105° C. after the addition of 0.825 ml. of 50% hydrogen peroxide. After 8½ hours a sample of 1 g. of reaction mixture, dissolved in 3 ml. of chloroform clouded after the addition of 2.8 ml. of methanol. The reaction mixture was then cooled to 50° C. and precipitated in the usual way in 750 ml. of methanol. The sucked-off telomer was again triturated with 500 ml. of methanol, again sucked off and dried in vacuum at 40° C. 35 g. of a white powder were obtained which was dissolved in acetone to give a clear solution and had a chlorine content of 1.25%. From the chlorine content, it can be calculated that 34.5% of diallyl phthalate and 5% of pentachloroethane have been consumed.

*Example 4*

As described in the previous examples, a mixture of 200 g. of diallyl phthalate, 20 g. of hexachloroethane and 11 g. of isopropanol with 50% hydrogen peroxide as catalyst was telomerized at 110° C. The addition of hydrogen peroxide took place in this case in portions of 0.2 ml. every 30 minutes. After the 9th addition (giving a total of 1.8 ml.) i.e. after 4 hours, the mixture was stirred for another hour without adding hydrogen peroxide. At this time, 1 g. of reaction product, dissolved in 3 ml. of chloroform, clouded when added to 2.6 ml. of methanol. The mixture was cooled, precipitated and isolated as described in the previous examples. 98 g. of telomer were obtained as a white powder with an iodine number of 55 and a chlorine content of 4.4%. From the last figure it may be calculated that 46.6% of the diallyl phthalate and 24% of the hexachloroethane have been consumed. The telomer is soluble in acetone.

*Example 5*

To 100 g. of the telomer powder produced from diallyl-ortho-phthalate and hexachloroethane (chlorine content 2.8%) according to Example 1, 0.5 g. of a polyglycidyl-ether resin, liquid at room temperature and with an epoxy content of 5.3 epoxy equivalents/kg., prepared by reacting epichlorohydrin with bis - (4 - hydroxyphenyl)dimethyl-methane in the presence of alkali, 1.2 g. of a 50% solution of t-butyl perbenzoate in dimethylphthalate, and 150 g. of acetone as diluent were added at room temperature and mixed. Glass fiber fabrics marketed under the trade name "fabric 318" by the firm Fibers de Verre, Lausanne, are soaked with the impregnation solution thus obtained, dried in air for 30 to 60 minutes and cut into squares (15×15 cm.).

In test 1, 14 layers of this material were piled up immediately after drying, in Sample 2, 14 layers of pre-impregnated fabric were piled after aging for one day at 60° C. The piles were hardened to a laminate in a heated press under the press conditions stated in the following table. The properties of the laminates are also shown in the table.

| | Test I | Test II |
|---|---|---|
| Hardening conditions | 30′, 120° C | 30′, 120° C. |
| Pressure in press, kg./cm.² | 20 | 20. |
| Pressure suitability | Very good | Very good. |
| Resin content, percent (±1%) | 30 | 30. |
| Thickness of sample, mm | 2.9 | 3.2. |
| Aging to the pre-impregnated fabrics | None | 1 day 60° C. |
| Flexural strength, kg./mm.² | 34.4 | 36.2. |
| Impact strength, cm. kg./cm.² | 87.3 | 65.2. |
| Water absorption, 4 days at 20° C. in percent | 0.89 | 0.97. |

What is claimed is:
1. A telomer of the formula

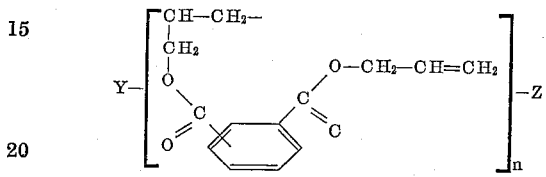

in which Y and Z represent the atoms and radicals formed by splitting a polychloroalkane YZ, Y is a hydrogen or chlorine atom and Z is the rest of the polychloroalkane molecule, said polychloroalkane consisting of a chain of 2 to 3 carbon atoms and to said carbon atoms are attached 5 to 8 chlorine atoms, and $n$ is an integer of at least 2 and at the most 20.

2. A telomer as claimed in claim 1, whose terminal end groups Y and Z have been formed by splitting of hexachloroethane.

3. A telomer as claimed in claim 1, whose terminal end groups Y and Z have been formed by splitting pentachlorethane.

4. A telomer as claimed in claim 1, whose terminal end groups Y and Z have been formed by splitting of 1,1,1,2,3,3,3-heptachloropropane.

5. A telomer as claimed in claim 1 containing structural units of the formula

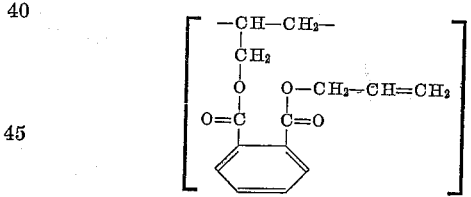

References Cited

Nowlin et al.: Society of Plastic Engineers Jour., 17, pp. 1093–1096 (1961).

LORRAINE A. WEINBERGER, *Primary Examiner.*

T. L. GALLOWAY, *Assistant Examiner.*